(12) United States Patent
Chen et al.

(10) Patent No.: US 7,735,919 B2
(45) Date of Patent: Jun. 15, 2010

(54) SAFETY BELT DEVICE AND SEAT ASSEMBLY INCORPORATING THE SAME

(75) Inventors: Shun-Min Chen, Taipei (TW); Kenny Cheng, Taipei (TW)

(73) Assignee: Wonderland Nurserygoods Co., Ltd. (TW)

( * ) Notice: Subject to any disclaimer, the term of this patent is extended or adjusted under 35 U.S.C. 154(b) by 359 days.

(21) Appl. No.: 11/741,386

(22) Filed: Apr. 27, 2007

(65) Prior Publication Data

US 2008/0157576 A1     Jul. 3, 2008

(30) Foreign Application Priority Data

Dec. 28, 2006   (CN)   ............... 2006 2 0164674 U

(51) Int. Cl.
*B60N 2/26* (2006.01)
*B60N 2/28* (2006.01)
*A47D 1/10* (2006.01)

(52) U.S. Cl. ............... 297/250.1; 297/474; 297/481; 297/484

(58) Field of Classification Search ............ 297/250.1, 297/474, 484, 481
See application file for complete search history.

(56) References Cited

U.S. PATENT DOCUMENTS

| 4,436,341 | A | * | 3/1984 | Converse | 297/484 X |
|---|---|---|---|---|---|
| 5,074,588 | A | * | 12/1991 | Huspen | 297/484 X |
| 5,294,183 | A | * | 3/1994 | Wetter et al. | 297/472 |
| 5,549,356 | A | * | 8/1996 | Gray | 297/484 X |
| 5,653,504 | A | * | 8/1997 | Henson | 297/484 X |
| 5,779,319 | A | * | 7/1998 | Merrick | 297/484 |
| 6,030,047 | A | * | 2/2000 | Kain | 297/484 |
| 6,045,184 | A | * | 4/2000 | Nakagawa | 297/250.1 |
| 6,273,505 | B1 | * | 8/2001 | Carnahan | 297/250.1 |
| 6,457,774 | B2 | * | 10/2002 | Baloga | 297/250.1 |
| 6,471,298 | B2 | * | 10/2002 | Carine et al. | 297/484 X |
| 6,626,492 | B1 | * | 9/2003 | Uno | 297/484 X |
| 6,695,412 | B2 | * | 2/2004 | Barger et al. | 297/484 |
| 6,698,841 | B1 | * | 3/2004 | Glover et al. | 297/484 |
| 6,955,403 | B1 | * | 10/2005 | Weaver | 297/484 X |
| 7,144,086 | B1 | * | 12/2006 | Harcourt et al. | 297/484 |
| 7,350,862 | B2 | * | 4/2008 | Fransen et al. | 297/250.1 |
| 7,445,286 | B2 | * | 11/2008 | Siewertsen et al. | 297/250.1 |
| 7,469,965 | B2 | * | 12/2008 | Glover et al. | 297/250.1 |
| 7,506,929 | B2 | * | 3/2009 | Fransen et al. | 297/250.1 |

* cited by examiner

*Primary Examiner*—Rodney B White
(74) *Attorney, Agent, or Firm*—Ostrolenk Faber LLP

(57) ABSTRACT

A safety belt device is mounted on a support member that is formed with a positioning hole, and includes a belt, an anchor member that permits a first end portion of the belt to extend therethrough and that is retained removably on the support member at the positioning hole, and an elastic component connected to the anchor member and disposed to support a second end portion of the belt such that the elastic component deforms when a pulling force is applied on the second end portion of the belt and restores the belt to an initial state when the pulling force on the second end portion of the belt is removed.

19 Claims, 9 Drawing Sheets

SAFETY BELT DEVICE AND SEAT ASSEMBLY INCORPORATING THE SAME

CROSS-REFERENCE TO RELATED APPLICATION

This application claims priority of Chinese application no. 200620164674.6, filed on Dec. 28, 2006.

BACKGROUND OF THE INVENTION

1. Field of the Invention

The invention relates to a safety belt device and a seat assembly incorporating the same, more particularly to a safety belt device that is suitable for application to different seat members, that can be automatically restored to an initial state when released from a fastened state, and that can be adjusted to suit different sizes of users to be seated on the seat member.

2. Description of the Related Art

Referring to FIGS. 1 and 2, a conventional car safety seat 1 includes a seat base 11, a seat body 12 disposed on the seat base 11, and a safety belt device 13. The seat body 12 includes a seat portion 121, a pair of lateral portions 122 extending respectively from opposite lateral sides of the seat portion 121, and a backrest portion 123 connected to the seat portion 121 and the lateral portions 122. The safety belt device 13 includes a pair of spring sleeves 131 that are disposed spacedly on the seat portion 121 and that are respectively adjacent to the lateral portions 122, a pair of spring sleeves 132 that are disposed spacedly on the backrest portion 123 and that are respectively adjacent to the lateral portions 122, a pair of shoulder straps 133 each extending between a respective one of the spring sleeves 131 on the seat portion 121 and a respective one of the spring sleeves 132 on the backrest portion 123 and each provided with a buckle tongue 134, and a buckle 135 provided on the seat portion 121 to engage removably the buckle tongues 134.

In an unused state, the spring sleeves 132 on the backrest portion 123 and the spring sleeves 131 on the seat portion 121 extend upward to tauten the shoulder straps 133, as best shown in FIG. 1. When a child (not shown) is seated on the seat portion 121, the shoulder straps 133 can be brought over the shoulders of the child, and the buckle tongues 134 are subsequently fastened to the buckle 135. At this time, the spring sleeves 132 on the backrest portion 123 deform to bend downward and accumulate a restoring force, as best shown in FIG. 2. Thereafter, when the buckle tongues 134 are released from the buckle 135, the spring sleeves 132 release the restoring force accumulated thereby to once again tauten the shoulder straps 133.

However, since the spring sleeves 132 are fixed at one end on the backrest portion 123, the heights of the spring sleeves 132 on the backrest portion 123 cannot be adjusted in order that the shoulder straps 133 can suit different children to be seated on the seat portion 121. Moreover, in view of the fixed mounting design of the safety belt device 13, it cannot be removed for subsequent application to another seat.

SUMMARY OF THE INVENTION

Therefore, one object of the present invention is to provide a safety belt device that can be mounted removably on varied support members.

Another object of the present invention is to provide a seat assembly with a safety belt device that can be automatically restored to an initial state when released from a fastened state, and that can be adjusted to suit different sizes of users to be seated on a seat member.

According to one aspect of the present invention, a safety belt device is adapted to be mounted on a support member that is formed with a positioning hole, and comprises a belt having opposite first and second end portions, an anchor member that permits the first end portion of the belt to extend therethrough and that is adapted to be retained removably on the support member at the positioning hole, and an elastic component connected to the anchor member and disposed to support the second end portion of the belt. The elastic component deforms when a pulling force is applied on the second end portion of the belt, and restores the belt to an initial state when the pulling force on the second end portion of the belt is removed.

According to another aspect of the present invention, a safety belt device is adapted to be mounted on a seat member that has a support member formed with a plurality of positioning holes and a plurality of coupling components each disposed near a respective one of the positioning holes. The safety belt device comprises: a belt having opposite first and second end portions, the first end portion of the belt being extendible through a selected one of the positioning holes and being retainable removably thereat; an anchor member coupled with the first end portion of the belt and adapted to be retained removably on the support member by the coupling component corresponding to the selected one of the positioning holes; and an elastic component connected to the anchor member and disposed to support the second end portion of the belt. The elastic component deforms when a pulling force is applied on the second end portion of the belt, and restores the belt to an initial state when the pulling force on the second end portion of the belt is removed.

According to yet another aspect of the present invention, a seat assembly comprises a seat member and a safety belt device.

The seat member has a seat portion that is provided with a belt fastener, and a support member that is connected to the seat portion and that is formed with a plurality of positioning holes.

The safety belt device includes a belt having opposite first and second end portions, an anchor member that permits the first end portion of the belt to extend therethrough and that is retained removably on the support member at a selected one of the positioning holes, and an elastic component connected to the anchor member and disposed to support the second end portion of the belt. The elastic component deforms when the second end portion of the belt is fastened to the belt fastener, and restores the belt to an initial state when the second end portion of the belt is released from the belt fastener.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
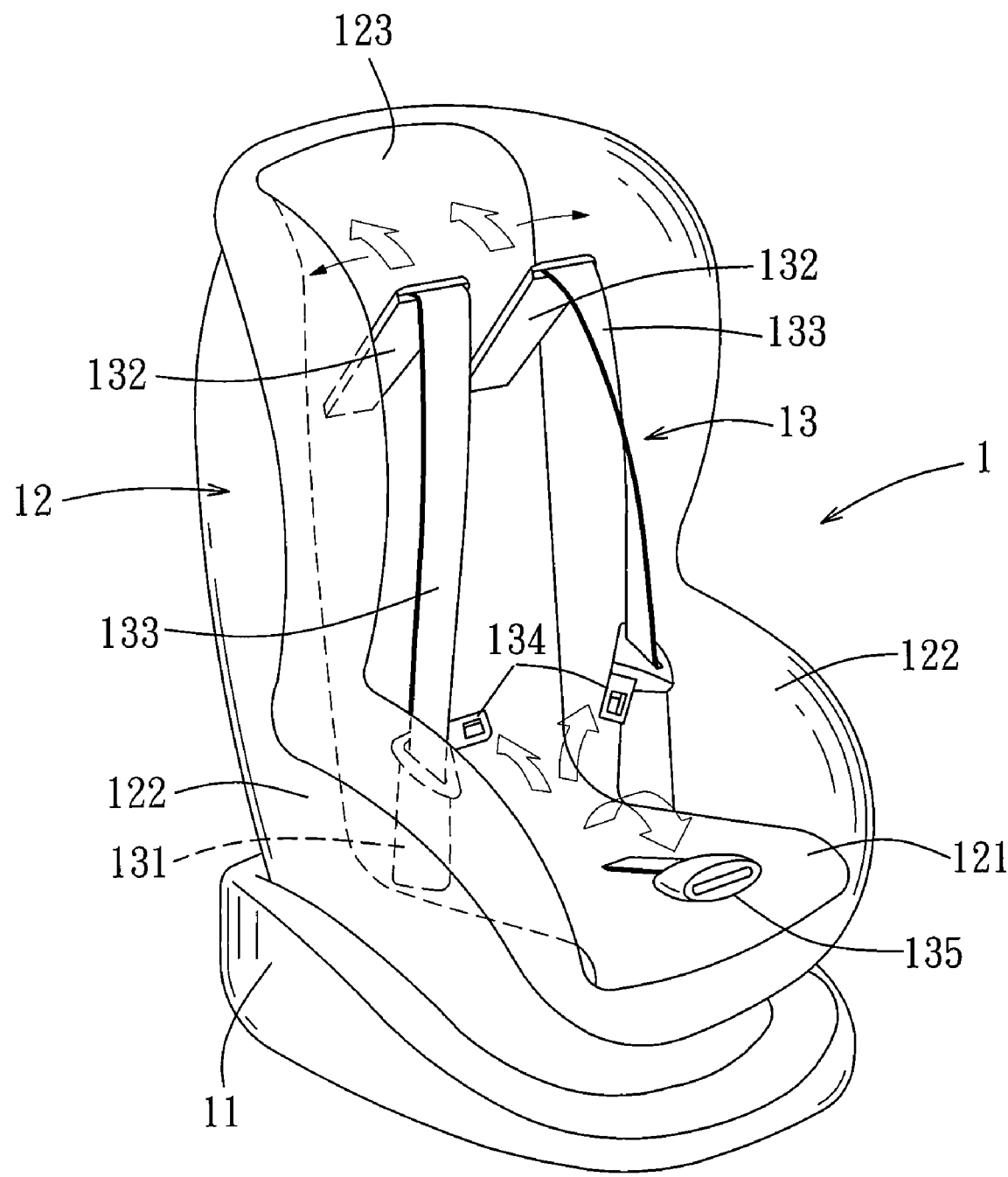
FIG. 1 is a perspective view of a conventional car safety seat, illustrating a safety belt device in an unfastened state.
Figure 2:
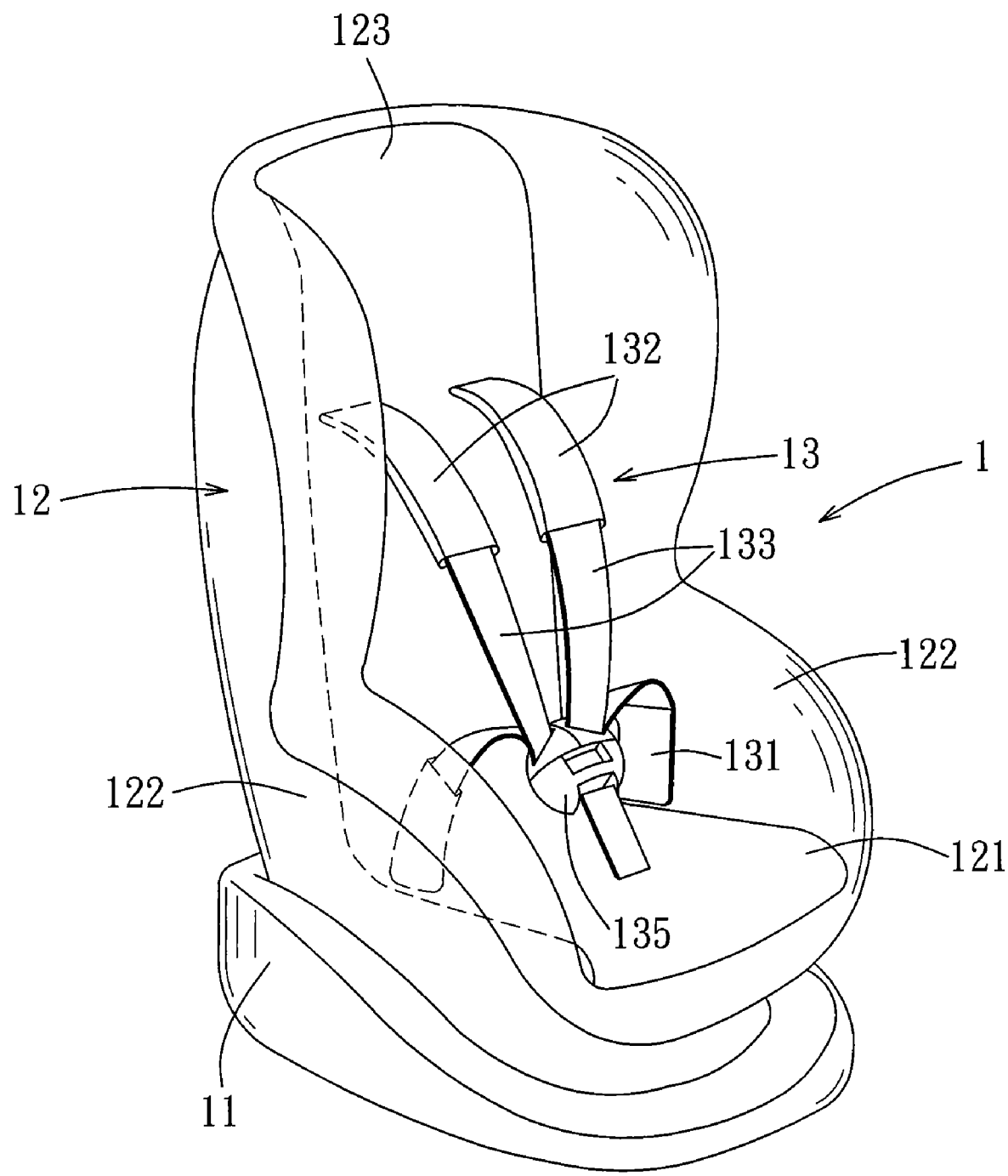
FIG. 2 is a perspective view of the conventional car safety seat, illustrating the safety belt device in a fastened state.

Before the present invention is described in greater detail with reference to the accompanying drawings, it should be noted herein that like elements are denoted by the same reference numerals throughout the disclosure.

Figure 3:
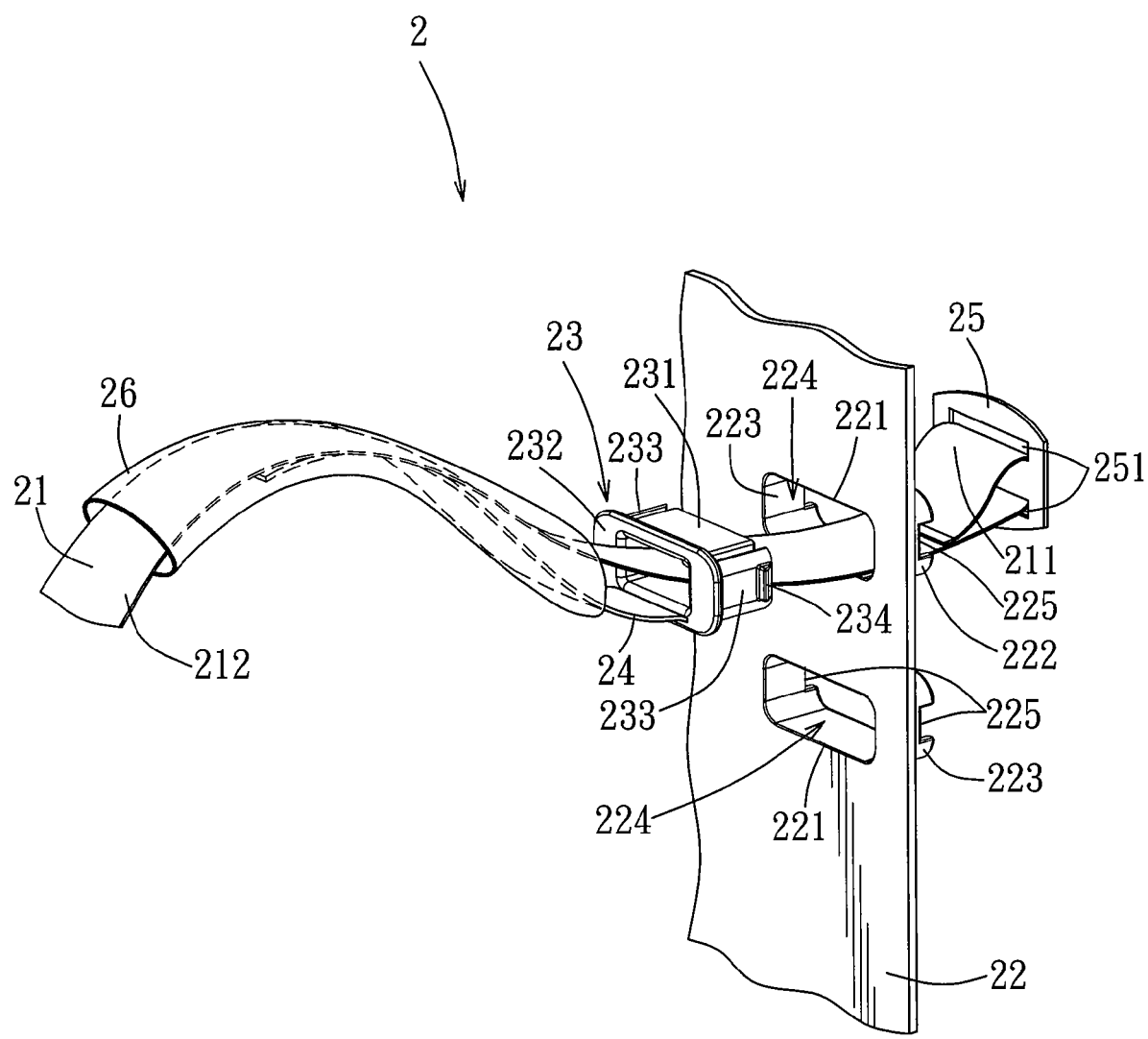
FIG. 3 is a perspective view of the preferred embodiment of a safety belt device according to the present invention.

Referring to FIG. 3, the preferred embodiment of a safety belt device 2 according to the present invention is adapted to be mounted on a support member 22 that is formed with a plurality of positioning holes 221 and a plurality of coupling components 222 each extending from a hole-defining periphery of a respective positioning hole 221. The positioning holes 221 can be arranged in rows or columns. In FIG. 3, the positioning holes 221 are arranged in a column. Each coupling component 222 is in the form of a surrounding wall 223 that confines a passage 224. The surrounding wall 223 has opposite wall parts formed with a first engaging unit 225. In this embodiment, the first engaging unit 225 is exemplified using a pair of notches that constitute a notch unit. The safety belt device 2 includes at least one belt 21 (only one is shown in FIG. 3), at least one anchor member 23 (only one is shown in FIG. 3), and at least one elastic component 24 (only one is shown in FIG. 3). The belt 21 can be a fabric belt or a leather belt, and has opposite first and second end portions 211, 212. The anchor member 23 permits the first end portion 211 of the respective belt 21 to extend therethrough, and is retained removably on the support member 22 by the coupling component 222 at a selected positioning hole 221. The anchor member 23 includes a housing 231 that is inserted through the selected positioning hole 221 in the support member 22 and into the passage 224 confined by the corresponding coupling component 222 and that permits extension of the first end portion 211 of the belt 21 therethrough, a flange 232 formed on one end of the housing 231 and disposed to abut against one side of the support member 22 at a peripheral portion defining the selected positioning hole 221, and a pair of resilient arms 233 connected to the flange 232 and respectively disposed at opposite lateral sides of the housing 231. The anchor member 23 further includes a second engaging unit 234 formed on distal ends of the resilient arms 233. In this embodiment, the second engaging unit 234 is exemplified using a pair of projections to engage removably the notches of the first engaging unit 225, thereby retaining removably the anchor member 23 on the support member 22. The elastic component 24 is an upwardly curved flexible body that can be integrally formed or welded to the housing 231 of the respective anchor member 23 adjacent to the flange 232. The elastic component 24 is disposed to support the second end portion 212 of the respective belt 21 thereon, i.e., the second end portion 212 of the belt 21 is disposed on top of the elastic component 24.

The safety belt device 2 further includes at least one stop ring 25 (only one is shown in FIG. 3) connected to the first end portion 211 of the respective belt 21, and at least one protective sleeve 26 (only one is shown in FIG. 3) that encloses the respective elastic component 24 and a portion of the second end portion 212 of the respective belt 21. The stop ring 25 is formed with a parallel pair of slots 251, and the first end portion 211 of the belt 21 has a loop segment extending through the slots 251 in the stop ring 25. The loop segment is formed by extending the belt 21 in sequence through the slots 251 in the stop ring 25, followed by stitching or application of an adhesive to the belt 21, thereby fixing the loop segment. The manner of forming the loop segment may vary depending on the material of the belt 21. In this embodiment, the stop ring 25 is configured with opposite shorter side edges and opposite longer side edges. The shorter side edges of the stop ring 25 are shorter than corresponding opposing side edges of the coupling components 222 and the positioning holes 221 in order to permit removal of the stop ring 25 from the anchor member 23 and to permit extension of the stop ring 25 through the passages 224 confined by the coupling components 222. The longer side edges of the stop ring 25 are longer than the other opposing side edges of the coupling components 222 and the positioning holes 221 so that removal of the first end portion 211 of the belt 21 through the positioning holes 221 can be stopped.

Figure 4:
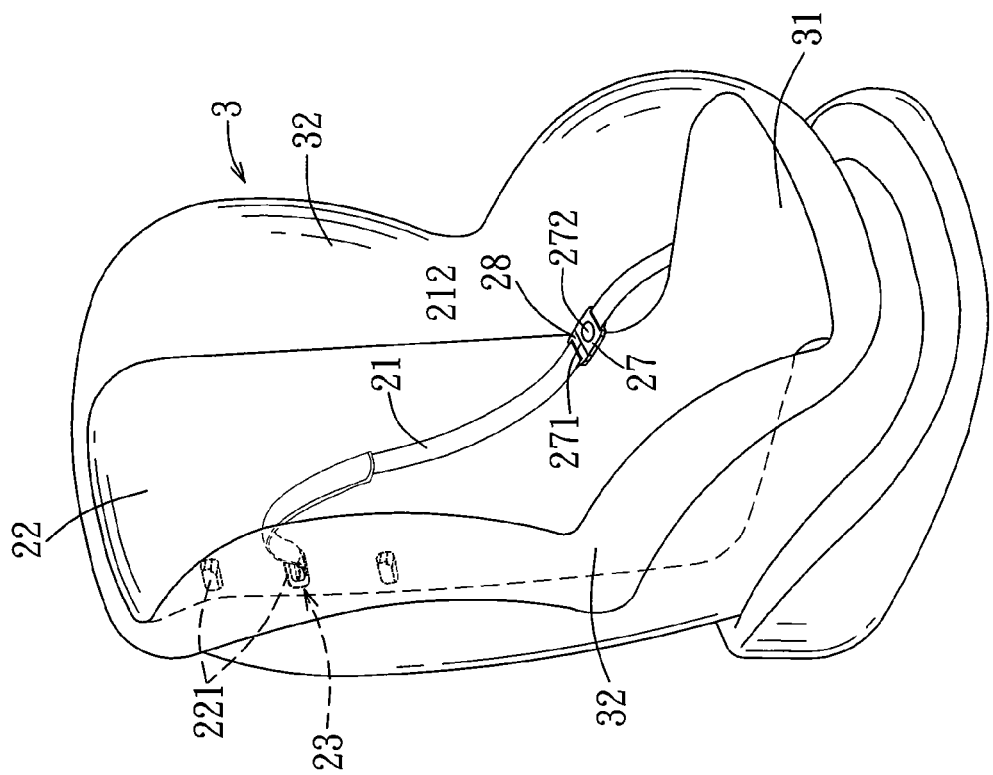
FIG. 4 is a perspective view of a car safety seat that incorporates a pair of the safety belt devices of the preferred embodiment.

FIG. 4 illustrates a car safety seat 3 that incorporates the safety belt device 2. The car safety seat 3 includes a seat portion 31, a pair of lateral portions 32 extending respectively from opposite lateral sides of the seat portion 31, and a backrest portion connected to the seat portion 31 and the lateral portions 32. The backrest portion serves as the aforementioned support member 22. The positioning holes 221 are formed in two columns in the backrest portion. In FIG. 4, the safety belt device 2 includes a pair of belts 21. In use, the belts 21 are brought over the shoulders of a child (not shown) seated on the seat portion 31, and the anchor members 23 on the belts 21 are retained by the coupling components 222 at selected ones of the positioning holes 221 in the manner described hereinabove. Since the positions of the anchor members 23 on the backrest portion are adjustable to correspond to the child seated on the seat portion 31, added comfort is possible.

Figure 5:
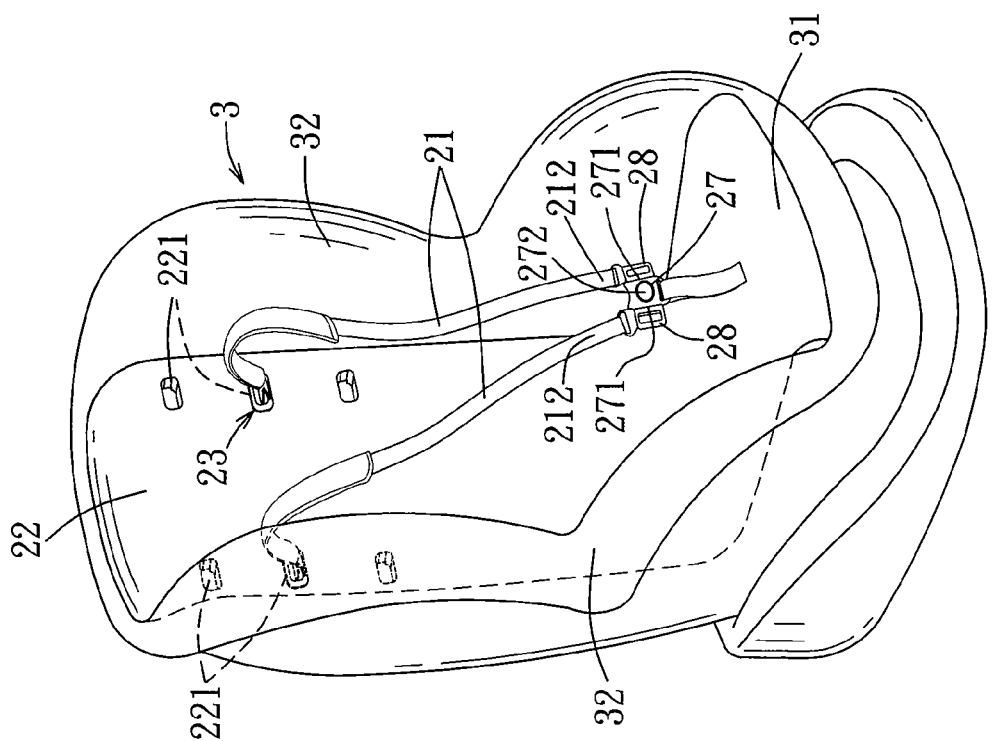
FIG. 5 is a perspective view of another car safety seat that incorporates the safety belt device of the preferred embodiment.

FIG. 5 illustrates another car safety seat 3 that incorporates the safety belt device 2. In FIG. 5, there is only one belt 21, and the belt 21 is extended diagonally over the child (not shown) seated on the seat portion 31.

In addition, as shown in FIGS. 4 and 5, the safety belt device 2 further includes a belt fastener or buckle 27 provided on the seat portion 31, and at least one buckle tongue 28 each provided on the second end portion 212 of the respective belt 21. The buckle 27 is formed with at least one tongue hole 271 (there are two tongue holes 271 in FIG. 4 and one tongue hole 271 in FIG. 5) to receive removably the buckle tongue 28, and a release mechanism 272 that is operable to release the buckle tongue 28 from retention in the tongue hole 271. Since the feature of the present invention does not reside in the specific constructions of the buckle 27 and the buckle tongue 28, which are known in the art, further details of the same are omitted herein for the sake of brevity.

Figure 7:
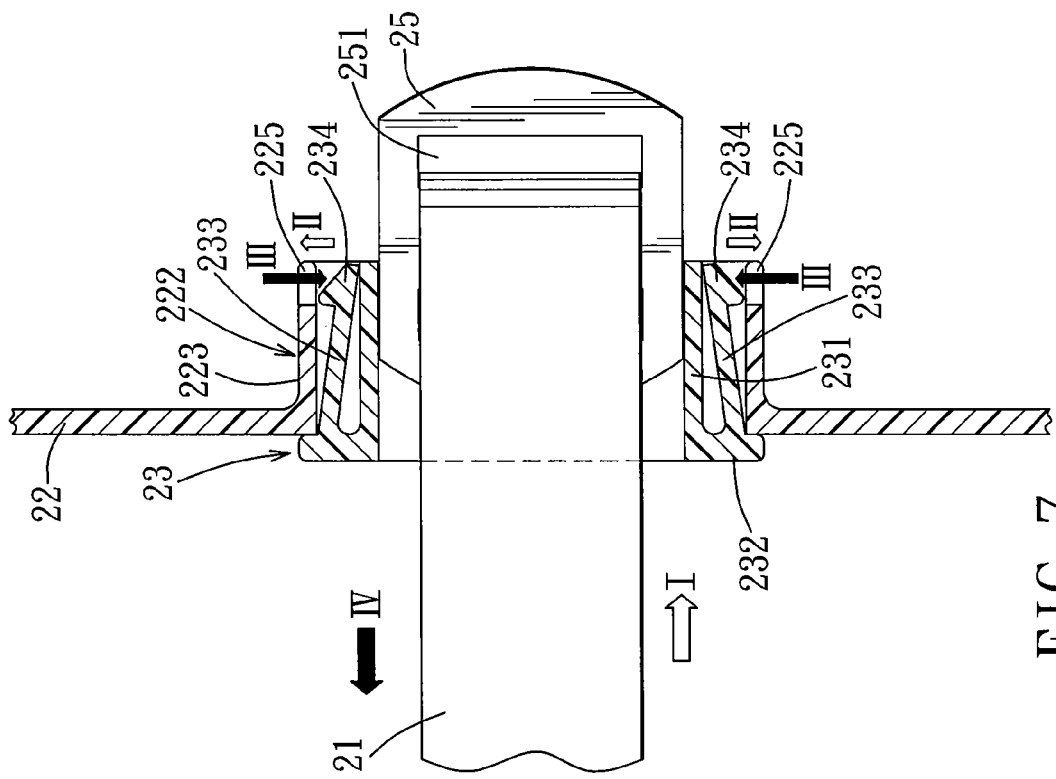
FIGS. 6 to 9 are fragmentary schematic partly sectional views to illustrate mounting and dismounting of an anchor member on a support member, and retention and removal of a belt from the anchor member.
Figure 6:
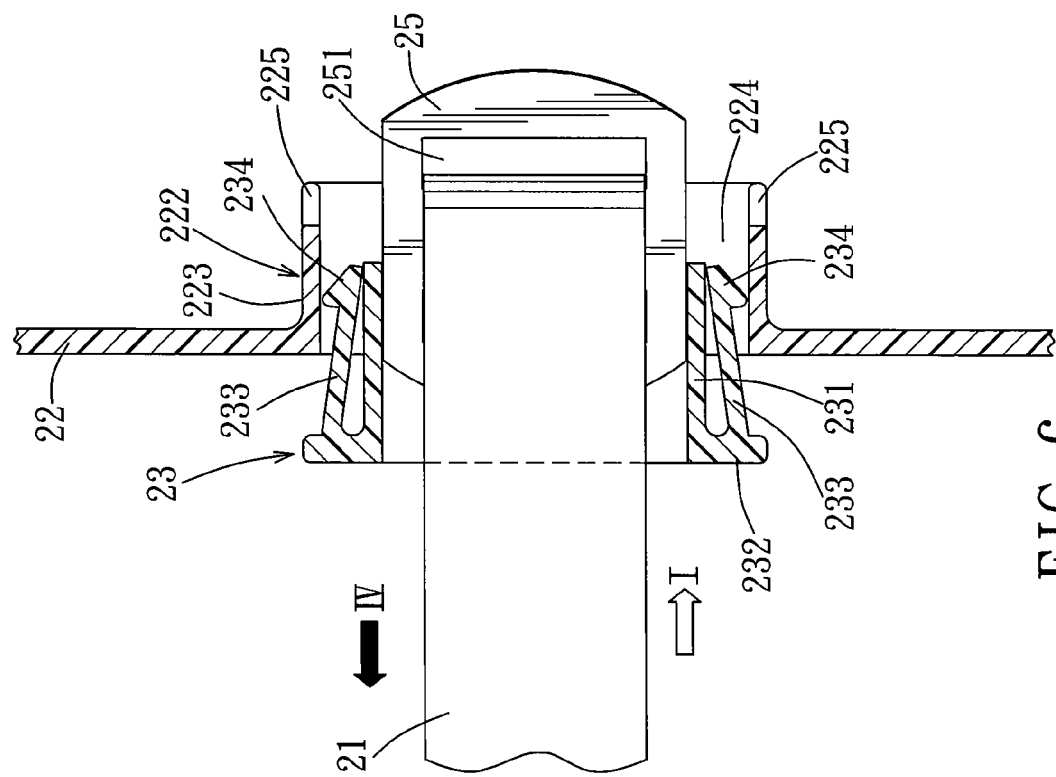
Figure 9:
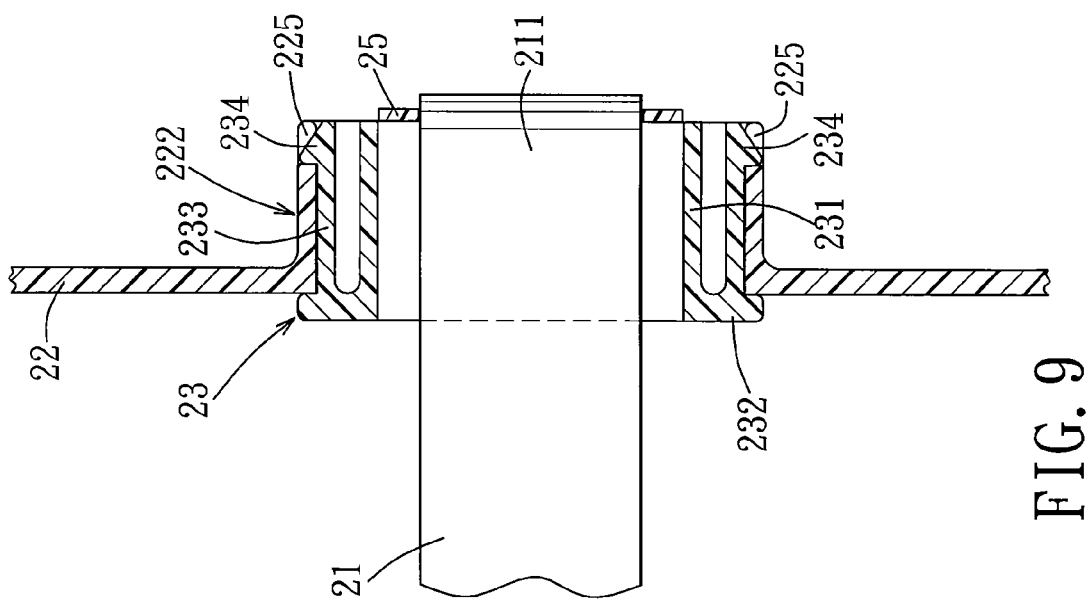
Figure 8:
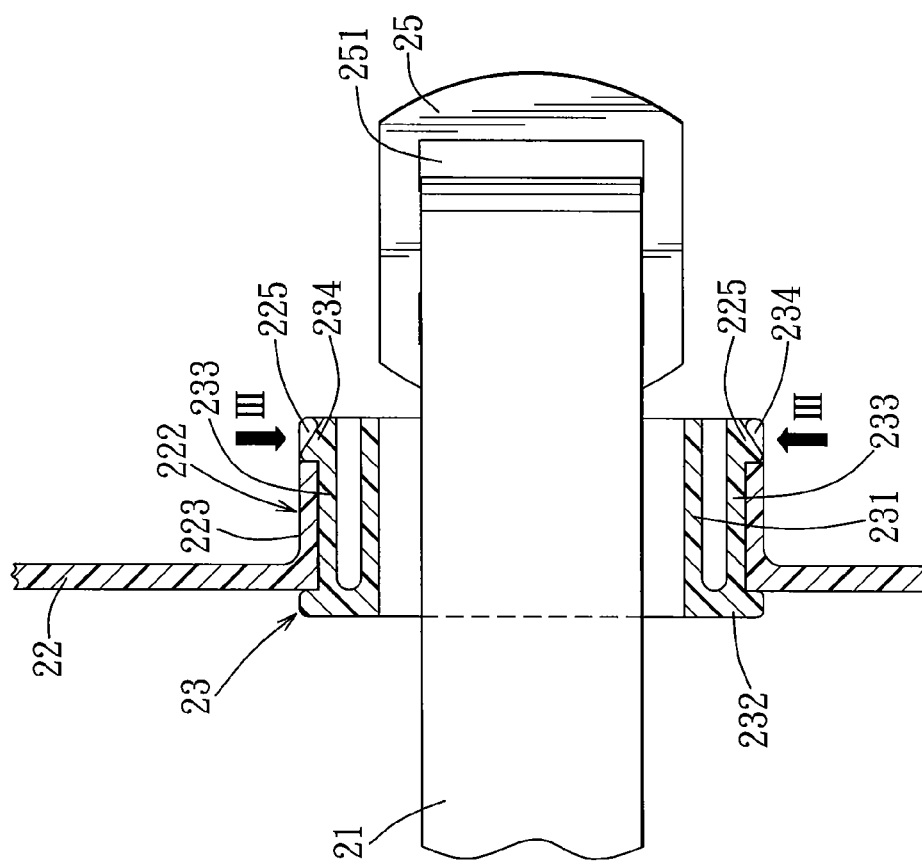
Figure 10:
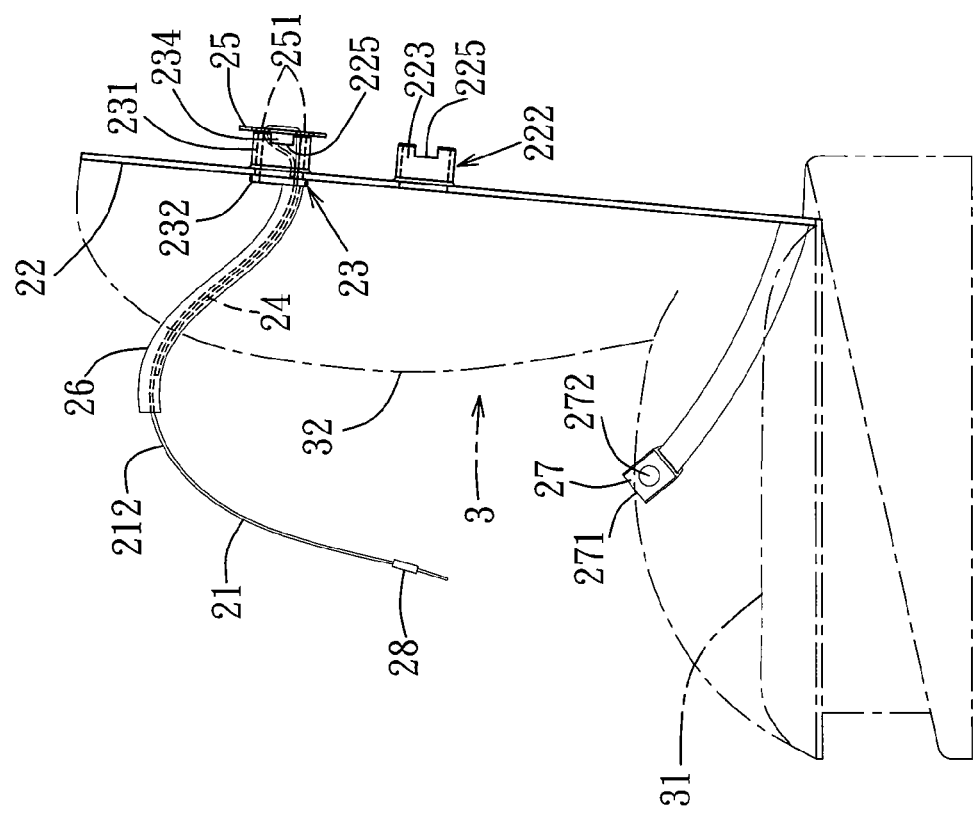
FIG. 10 is a schematic side view of a car safety seat to illustrate an unfastened state of the safety belt device of the preferred embodiment.

Referring to FIGS. 6, 7 and 8, when installing the safety belt device 2 at a selected positioning hole 221 on the support member 22 (i.e., the backrest portion), the stop ring 25 is first oriented such that the shorter side edges thereof can pass through the passage 224 confined by the corresponding coupling component 222 at the selected positioning hole 221 in the direction indicated by arrow (I). When the anchor member 23 is inserted into the passage 224 of the corresponding coupling component 222, the projections of the second engaging unit 234 are forced toward the housing 231 by the surrounding wall 223 of the coupling component 222, thereby causing the resilient arms 233 to flex and accumulate a restoring force. Thereafter, when the projections of the second engaging unit 234 are eventually aligned with the notches of the first engaging unit 225, the resilient arms 233 release the restoring force accumulated thereby, thus moving the projections into the notches in the directions indicated by arrows (II) in FIG. 7 to result in engagement between the first and second engaging units 225, 234, as best shown in FIG. 8. At this time, the flange 232 of the anchor member 23 abuts against the support member 22 at the peripheral portion defining the selected positioning hole 221. The stop ring 25 is then oriented as shown in FIG. 3 or FIG. 9 such that the longer side edges thereof can stop removal of the first end portion 211 of the belt 21 through the selected positioning hole 221. The anchor member 23 is retained on the support member 22 at the selected positioning hole 221 at this time. Referring to FIG. 10, when the buckle tongue 28 on the second end portion 212 of the belt 21 is disengaged from the buckle 27 on the seat portion 31, the elastic component 24 has an upwardly curving shape, i.e., the elastic component 24 is in a released state.

Figure 11:
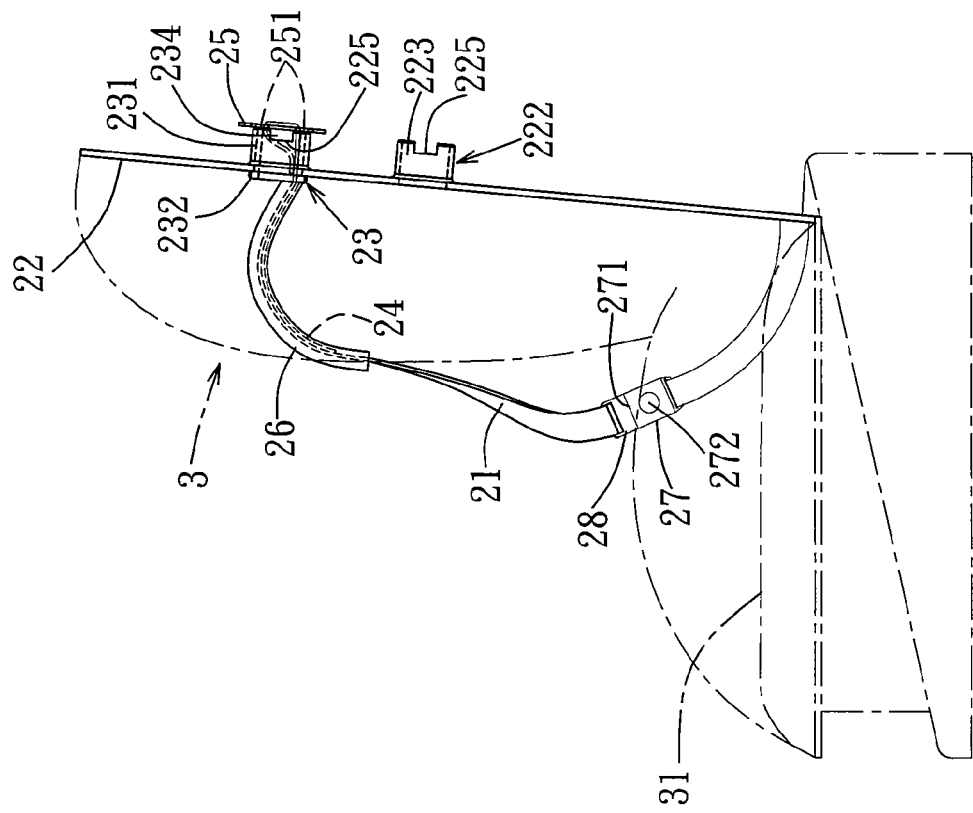
FIG. 11 is a schematic side view similar to FIG. 10, but illustrating a fastened state of the safety belt device of the preferred embodiment.

Referring to FIGS. 10 and 11, when it is desired to fasten a child (not shown) seated on the seat portion 31 to the car safety seat 3, the buckle tongue 28 on the belt 21 is brought into engagement with the buckle 27 on the seat portion 31, thereby resulting in a pulling force applied on the second end portion 212 of the belt 21 that causes the elastic component 24 to deform to a downwardly curving shape, i.e., the elastic component 24 is in a force accumulating state. Thereafter, when the release mechanism 272 is operated to release the buckle tongue 28 from the tongue hole 271 in the buckle 27, the pulling force on the second end portion 212 of the belt 21 is removed, and the elastic component 24 releases the restoring force accumulated thereby to resume a former shape thereof. The elastic component 24 moves the second end portion 212 of the belt 21 away from the support member 22 to restore the belt 21 to an initial state so as to facilitate moving the child from the seat portion 31 of the car safety seat 3.

To adjust the height of the anchor member 23 on the support member 22, the projections of the second engaging unit 234 are pressed toward the housing 231 in the directions indicated by arrows (III) in FIG. 8 to disengage the notches of the first engaging unit 225. Then, the anchor member 23 is pulled in the direction indicated by arrow (IV) in FIG. 7 to move the anchor member 23 away from the support member 22. At this time, the projections of the second engaging unit 234 are forced toward the housing 231 by the surrounding wall 223 of the coupling component 222, thereby causing the resilient arms 233 to flex and accumulate a restoring force. The resilient arms 233 release the restoring force accumulated thereby when the anchor member 23 is completely removed from the coupling component 222. The safety belt device 2 is ready to be installed on the support member 22 at another positioning hole 221 in the aforementioned manner at this time to adjust the height of the belt 21 on the support member 22.

Figure 12:
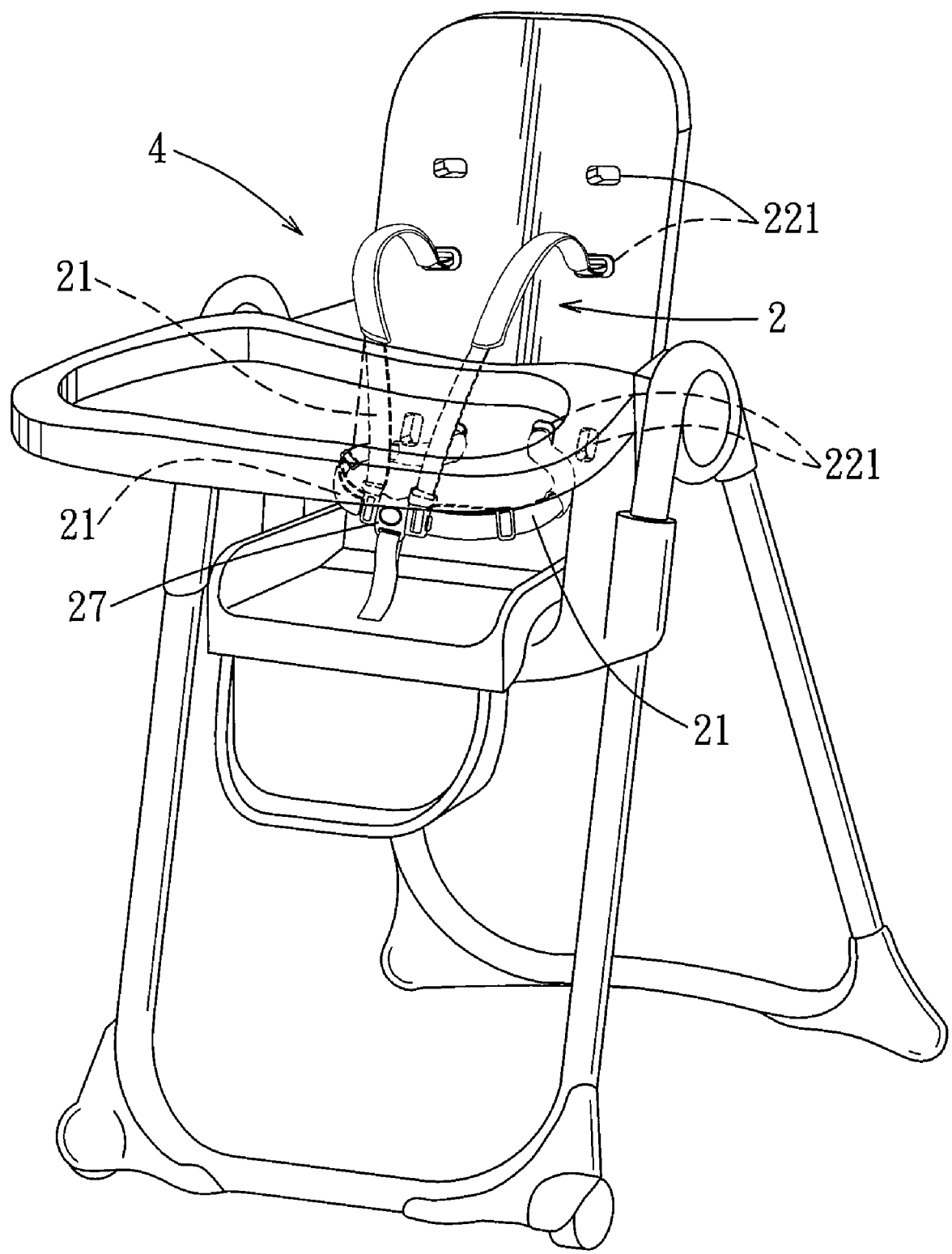
FIG. 12 is a perspective view of a highchair that incorporates the safety belt device of the preferred embodiment.
Figure 13:
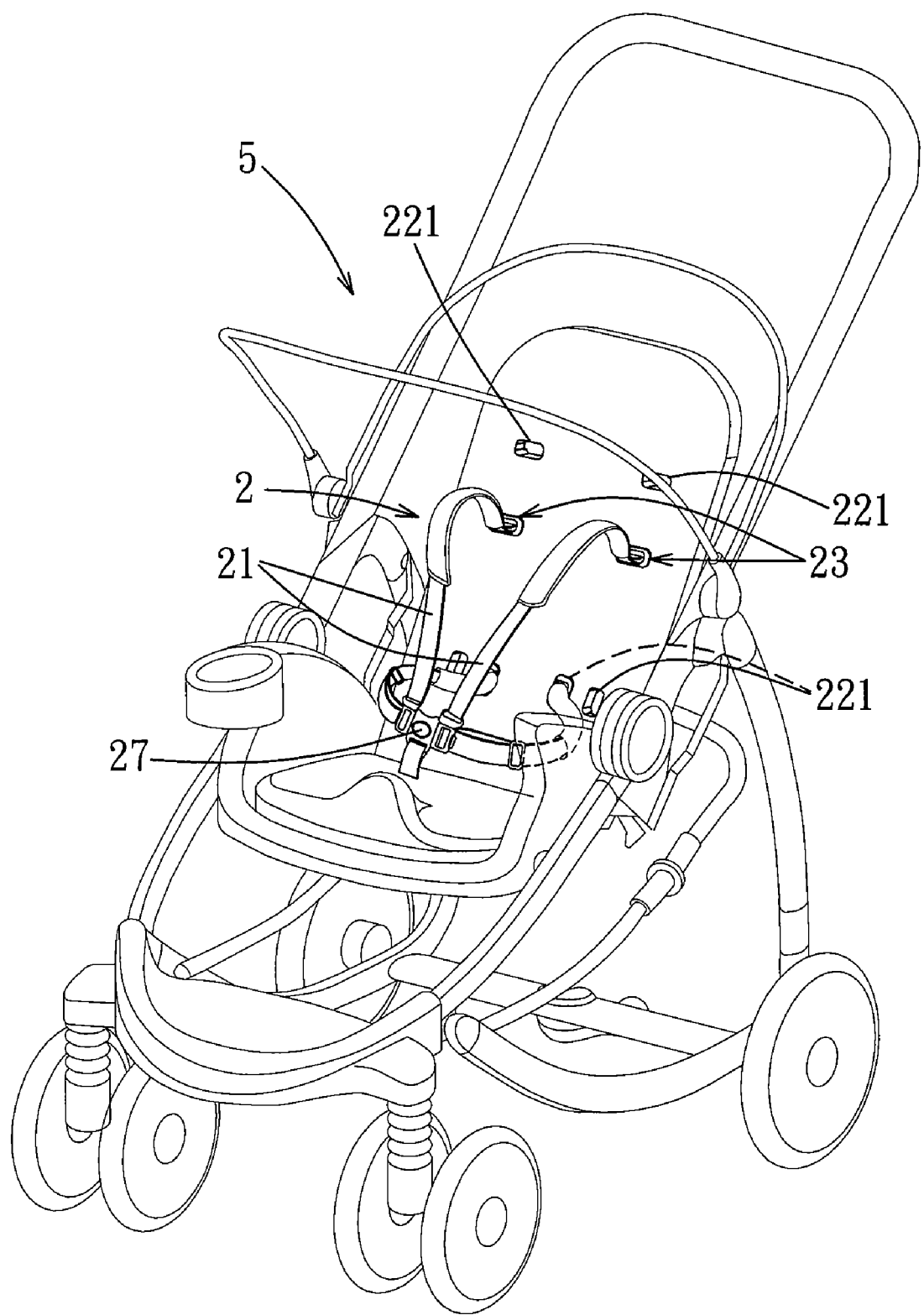
FIG. 13 is a perspective view of a stroller that incorporates the safety belt device of the preferred embodiment.

The safety belt device 2 of this invention is also adapted for application to a highchair 4 (see FIG. 12) or a stroller 5 (see FIG. 13). It is noted that, aside from aligning the positioning holes 221 in two columns in the support member 22, the positioning holes 221 can be further aligned in a row on the support member 22 adjacent to a waist portion of a child (not shown) seated in the highchair 4 or the stroller 5, and the number of the belts 21 can be increased to four, wherein two of the belts 21 serve as shoulder straps retained on selected ones of the positioning holes 221 in the two columns by corresponding anchor members 23 for extension over the shoulders of the seated child, and the other two of the belts 21 serve as waist straps retained on selected ones of the positioning holes 221 in the row by corresponding anchor members 23 for extension over the waist of the seated child. Each of the belts 21 can be fastened to a belt fastener or buckle 27. Therefore, not only are the shoulders of the child positioned, the waist of the child is positioned as well to enhance safety. The belts 21 are also adjusted through retention of the anchor members 23 at appropriate ones of the positioning holes 221 to correspond not only to the height of the child but also to waist dimensions of the child.

It has thus been shown that, through the removable retention of the anchor member 23 on the support member 22 in the safety belt device 2 of this invention, the position of the belt 21 can be easily adjusted to suit different users. In addition, through the elastic component 24, the belt 21 can be easily moved once the buckle tongue 28 is unfastened from the buckle 27 so as not to interfere with body movement, thereby resulting in added convenience.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A safety belt device configured to be mounted on a support member including a positioning hole, said safety belt device comprising:
   a belt having a first end portion and a second end portion at an opposite end than the first end portion;
   an anchor member positioned and configured to be retained in a selectively removable manner on the support member at the positioning hole and to receive said first end portion of said belt such that said first end portion extends through said anchor member; and
   an elastic component connected to said anchor member, said elastic component having an initial state in which the elastic component presses up on the belt and configured to support said second end portion of said belt such that said elastic component deforms to enter a second state different from the initial state when a pulling force is applied to said second end portion of said belt, and the elastic component being configured to restore to the initial state when the pulling force on said second end portion of said belt is ceased.

2. The safety belt device as claimed in claim 1, further comprising:
   a first engaging unit configured to be positioned on the support member; and
   a second engaging unit positioned on said anchor member and configured to engage removably said first engaging unit thereby retaining removably said anchor member on the support member.

3. The safety belt device as claimed in claim 2, wherein said anchor member includes:
   a housing configured to be inserted through the positioning hole in the support member and to receive said first end portion of said belt such that said first end portion of the belt extends through the housing;

a flange positioned on one end of said housing and configured to abut against one side of the support member at a peripheral portion defining the positioning hole; and a resilient arm connected to said flange and positioned at a lateral side of said housing.

4. The safety belt device as claimed in claim 3, wherein said first engaging unit is a notch unit, and said second engaging unit is a projection positioned on a distal end of said resilient arm.

5. The safety belt device as claimed in claim 1, further comprising a stop ring connected to said first end portion of said belt and positioned and configured to stop removal of said first end portion of said belt through the positioning hole.

6. The safety belt device as claimed in claim 5, wherein said stop ring includes a pair of slots, and said first end portion of said belt includes a loop segment extending through said slots in said stop ring.

7. The safety belt device as claimed in claim 1, wherein said second end portion of said belt is positioned on top of said elastic component.

8. The safety belt device as claimed in claim 1, further comprising a protective sleeve enclosing said elastic component and a portion of said second end portion of said belt.

9. The safety belt device as claimed in claim 1, wherein said anchor member includes a housing configured to be mounted at the positioning hole in the support member, and said elastic component is connected integrally to said housing.

10. A safety belt device configured to be mounted on a seat member that comprising a support member including a plurality of positioning holes and a plurality of coupling components, each coupling component positioned at a respective positioning hole of the plurality of positioning holes, said safety belt device comprising:

a belt having first end portion and a second end portion at an opposite end than the first end portion;

said first end portion of said belt being extendible through a selected positioning hole of the plurality of positioning holes and being retainable removably at the selected positioning hole;

an anchor member positioned and configured to be retained in a selectively removable manner on the support member at the positioning hole and to receive said first end portion of said belt such that said first end portion extends through said anchor member; and an elastic component connected to said anchor member, said elastic component having an initial state in which the elastic component presses up on the belt and configured to support said second end portion of said belt such that said elastic component deforms to enter a second state different from the initial state when said belt is moved from the initial position by a pulling force applied to said second end portion of said belt, and the elastic component being configured to restore said belt to the initial state when the pulling force on said second end portion of said belt is ceased.

11. The safety belt device as claimed in claim 10, further comprising:

a first engaging unit configured to be positioned on the coupling component; and a second engaging unit provided on said anchor member and configured to engage removably said first engaging unit such that said anchor member is retained removably on the support member.

12. The safety belt device as claimed in claim 11, wherein said first engaging unit is a notch unit, and said second engaging unit is a projection that corresponds to said notch unit.

13. The safety belt device as claimed in claim 10, further comprising a stop ring connected to said first end portion of said belt, said stop ring having opposite side edges with dimensions shorter than corresponding side edges of the positioning holes.

14. The safety belt device as claimed in claim 10, further comprising a protective sleeve that encloses said elastic component and a portion of said second end portion of said belt.

15. The safety belt device as claimed in claim 10, wherein said anchor member includes a housing configured to be inserted through the selected one of the positioning holes in the support member, and said elastic component is connected integrally to said housing.

16. A seat assembly comprising a seat member and a safety belt device;

said seat member comprising a seat portion, a belt fastener and a support member connected to said seat portion and including a plurality of positioning holes;

said safety belt device comprising:

a belt having a first end portion and a second end portion at an opposite end than the first end portion;

an anchor member positioned and configured to be retained in a selectively removable manner on the support member at the positioning hole and to receive said first end portion of said belt such that said first end portion extends through said anchor member; and an elastic component connected to said anchor member, said elastic component having an initial state in which the elastic component presses up on the belt and configured to support said second end portion of said belt such that said elastic component deforms to enter a second state different from the initial state when said second end portion of said belt is fastened to said belt fastener and the belt is thus moved from the initial position, and to enter a second state different from the initial state said belt to the initial state when said second end portion of said belt is released from said belt fastener.

17. The seat assembly as claimed in claim 16, wherein said safety belt device further includes:

a first engaging unit positioned on said support member; and a second engaging unit positioned on said anchor member and configured to engage removably said first engaging unit so as to retain removably said anchor member on said support member at the selected one of said positioning holes.

18. The seat assembly as claimed in claim 16, wherein said safety belt device further includes a protective sleeve enclosing said elastic component and a portion of said second end portion of said belt.

19. The seat assembly as claimed in claim 16, wherein said anchor member includes a housing mounted at the selected one of said positioning holes in said support member, and said elastic component is connected integrally to said housing.

* * * * *